(12) United States Patent
Woodward

(10) Patent No.: US 7,095,958 B1
(45) Date of Patent: Aug. 22, 2006

(54) FIBER ACCESS ARCHITECTURE CAPABLE OF BEING SEAMLESSLY UPGRADED

(75) Inventor: Sheryl Leigh Woodward, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/032,708

(22) Filed: Jan. 11, 2005

Related U.S. Application Data (62) Division of application No. 09/950,578, filed on Sep. 13, 2001.

(51) Int. Cl.
*H04J 14/02* (2006.01)

(52) U.S. Cl. .......................... 398/72; 398/68
(58) Field of Classification Search ......... 398/68–72
See application file for complete search history.

(56) References Cited

U.S. PATENT DOCUMENTS 6,122,096 A    9/2000  Fatehi 6,493,117 B1   12/2002 Milton et al.
6,687,463 B1   2/2004  Hutchison et al.

OTHER PUBLICATIONS

Beyond Moore's Law, O. Sniezko and X. Lu, 2000 IEEE/LEOS Summer Topical Meeting , Jul. 26-28, 2000, paper THC2.1, p. 21-26.*

* cited by examiner

*Primary Examiner*—Leslie Pascal (57) ABSTRACT

Disclosed is an architecture enabling premium services to be provided over fiber to high-end users/customers. The architecture has a plurality of nodes and a passive optical device inserted prior to one of the nodes. The optical device allows wavelengths provisioned for original service(s) to pass through with minimal loss, while other wavelengths provisioned for the premium services are diverted onto a new fiber. This new fiber may be installed at the time of the upgrade, but, sometimes, dark fiber is available. Dark fiber is fiber that carries no optical signals.

2 Claims, 9 Drawing Sheets

FIBER ACCESS ARCHITECTURE CAPABLE OF BEING SEAMLESSLY UPGRADED

This application is a divisional of prior application Ser. No. 09/950,578 filed Sep. 13, 2001, which is incorporated herein by reference.

FIELD OF THE INVENTION

The present invention relates generally to upgrading passive optical networks and Hybrid Fiber Coax (HFC) communications systems. In particular, the present invention relates to a system, which allows existing systems to be efficiently upgraded with minimal disruption to existing infrastructure. This upgrade can provide users with new high-speed services via fiber optic connections thereby bypassing the coax bus in HFC communication systems, and the passive splitter in passive optical networks.

BACKGROUND OF THE INVENTION

HFC systems have been and continue to be deployed to meet the ever-increasing demand for high-speed communications. Upgrading the existing and planned HFC systems to provide for new and additional services such as high data rate connection, which support Gigabit-Ethernet (GbE) to a Local Area Network (LAN), or a passive optical network that serves a number of customers is problematical. HFC systems/architectures use the Data Over Cable Service Interface Standard (DOCSIS) for data services. Due to constraints imposed by the coax portion of the HFC infrastructure, DOCSIS provides limited upstream capability (from the customer to the central office). This translates to limited upstream capacity that is extremely reliant on RF technology.

While power-splitting passive-optical networks (PS-PONs) are not reliant upon RF technology, they also have a limited capacity, as both the upstream and downstream channels must be shared (typically using Time-Division Multiplexing (TDM)), which can limit the bit-rate available to customers. See the FSAN standard, ITU Standard: (G.983.1).

Both HFC and PS-PONs carry the same downstream signals to multiple customers. Beyond the first node of the system multiple paths are typically used. In a PS-PON, the first node is a passive splitter and the multiple paths are multiple fibers. These fibers carry signals to additional splitters, or to optical-network units (ONUs), where optical-to-electronic conversion takes place. In a typical HFC architecture the first node is a fiber-node, where the optical signal is converted into an electronic signal, and carried over multiple coax buses for distribution throughout a neighborhood. In some instances the fiber-node will only serve a single coax bus. In a recently demonstrated HFC architecture, known as LightWire™ the first node is a Mux-Node, containing an optical splitter. Downstream signals are split, and carried over multiple fibers to mini-fiber-nodes, where the optical-to-electronic conversion takes place. In another HFC architecture, known as Oxiom, nodes are "daisy-chained" together. In these nodes, referred to as Ox-nodes, part of the optical power carrying the downstream signal is tapped off, converted to an electronic signal and sent via coax to customers, the remaining optical power continues to the next Ox-node in the "daisy chain". Therefore, in the Oxiom architecture the downstream signals are carried to multiple customers via paths comprising both coax and fiber.

These and other problems have been overcome by the present invention.

SUMMARY OF THE INVENTION

The present invention relates to a system, which allows existing HFC and PON systems to be efficiently upgraded with minimal disruption to existing infrastructure. This upgrade can provide users with new high-speed services via fiber optic connections thereby bypassing the coax bus, or the shared portion of the PON. The present invention makes it easier to provision new wavelengths for new services over the existing architecture without requiring modifications to every node within the service area. The provisioning of new wavelengths is accomplished by bypassing the final distribution portion of the network—the fiber (and coax) beyond the first node. This results in the ability to provide premium services to high-end users/customers over fiber.

A passive optical device is inserted prior to the first node of the architecture. This device allows wavelengths provisioned for the original service(s) to pass through with minimal loss, while other wavelengths are diverted onto a new fiber. This. new fiber may be installed at the time of the upgrade, but, sometimes, dark fiber is available. Dark fiber is fiber that carries no optical signals.

Since fiber-optic cable is sold with multiple fibers per cable, there are sometimes spare fibers. In addition, spare fiber may have been intentionally laid at the time the original network was installed so that if new developments become available (due to new construction, or the acquisition of "right-of-way") the network could be expanded and extended. This fiber may be available for new traffic and new services. In the Oxiom architecture, three fibers are deployed, one for the original downstream traffic, one for upstream traffic, and the third is for future serving-area segmentation. For example, the Oxiom or LightWire™ architecture may be upgraded so that each different node receives different wavelengths—thus enhancing the quality of the original service because the channel bandwidth is not shared by as many users. This requires that a node near the customers' premises be modified. The fiber deployed for future serving-area segmentation could alternatively be used to distribute signals carrying new services.

Transmitting signals carrying new services on separate fiber from the original signals allows either service to be upgraded without affecting the other one. This is especially important in the distribution portion of the network (that portion of that network nearest the customers' premises). Keeping these signals on separate fibers near the customers' premises reduces the probability that the services will disrupt one another. Because the Oxiom architecture has only one fiber reserved for upgrades, and because in other locations only one fiber might be available, bi-directional transmission should be used to carry these new signals and services.

Though there may be spare fiber available near the customers premises, it does not always connect all the way back to a network hub or central office. In addition, transmission between the first node and the central office may require optical amplifiers. It would, therefore, be good to carry the traffic for new services over the same infrastructure carrying the original traffic as far as possible, especially when optical amplification is required. Near the final segment of the distribution architecture the services can be separated based upon the wavelength of the light carrying the signals.

The services can be separated from one another at a wavelength partition—a device that routes wavelengths to the appropriate fiber based upon the wavelength of the light, and the direction it is traveling. In order to minimize the disruption of service to the customers subscribing to the original service, it would be good to separate all the new signals from the original signals at a single point. This can be accomplished by installing the wavelength partition before the first node. A segment of optical cable carrying signals from the core optical network to the wavelength partition carries signals associated with multiple services on a single optical fiber, while A segment of optical cable connecting the wavelength partition to the nodes will carry signals associated with different services on different fibers. (An optical cable typically comprises multiple optical fibers deployed along the same path. These fibers are frequently bound together in a common sheath.)

In some instances, it may be more cost-effective to use multiple wavelength partitions, but most wavelength partitions will be upstream from multiple nodes, so that fewer wavelength partitions are required.

Some, but not all, current PON systems can be easily modified without disrupting service to existing customers/users. During the initial deployment of the PON system an optical filter is placed before each ONU. The optical filter allows only signals carried at the initially deployed wavelength(s) to be transmitted. All other wavelengths are dropped. This permits the additional/new wavelengths to be used to provide new and future services without the new signals/wavelengths interfering with the original signals. The new wavelengths also reach customers via the power-splitting node, and only those customers subscribing to the new services require additional equipment to receive the wavelengths carrying the new services. Because the wavelengths carrying the signals for these new services also travel through the passive splitter, the wavelengths are also attenuated by the splitting loss. This optical loss will need to be overcome with higher-power optical sources, and may ultimately limit the bit-rate that can be provided in this manner.

To upgrade a system deployed without these filters is difficult, as every ONU must have a filter added. Not only does this require modifications to be made to multiple pieces of network equipment, it also introduces additional loss in the system, which can adversely affect performance It is, therefore, an object of the present invention to permit easy, cost-efficient modification of deployed HFC and PON systems to seamlessly support new high-speed services.

It is a further object of the present invention to permit easy, cost-efficient modification of HFC and PON systems in the planning stages but not yet deployed to seamlessly support new high-speed services.

It is yet another object of the present invention to provision new wavelengths for new (future) high-speed services over existing and planned HFC and PON systems/architectures.

BRIEF DESCRIPTION OF THE DRAWINGS

The invention is best described with reference to the detailed description and the following figures, where.

DETAILED DESCRIPTION OF THE PREFERRED EMBODIMENTS

Figure 1:
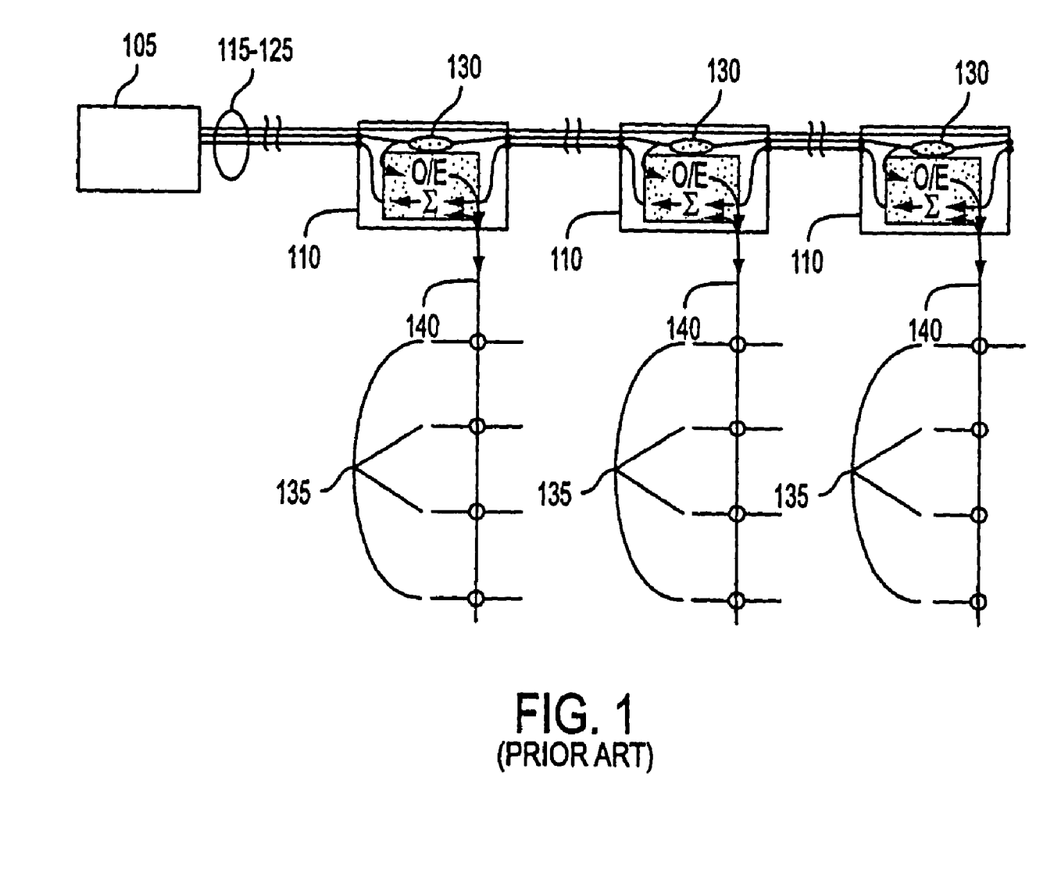
FIG. 1 is an exemplary prior art HFC architecture.
Figure 2:
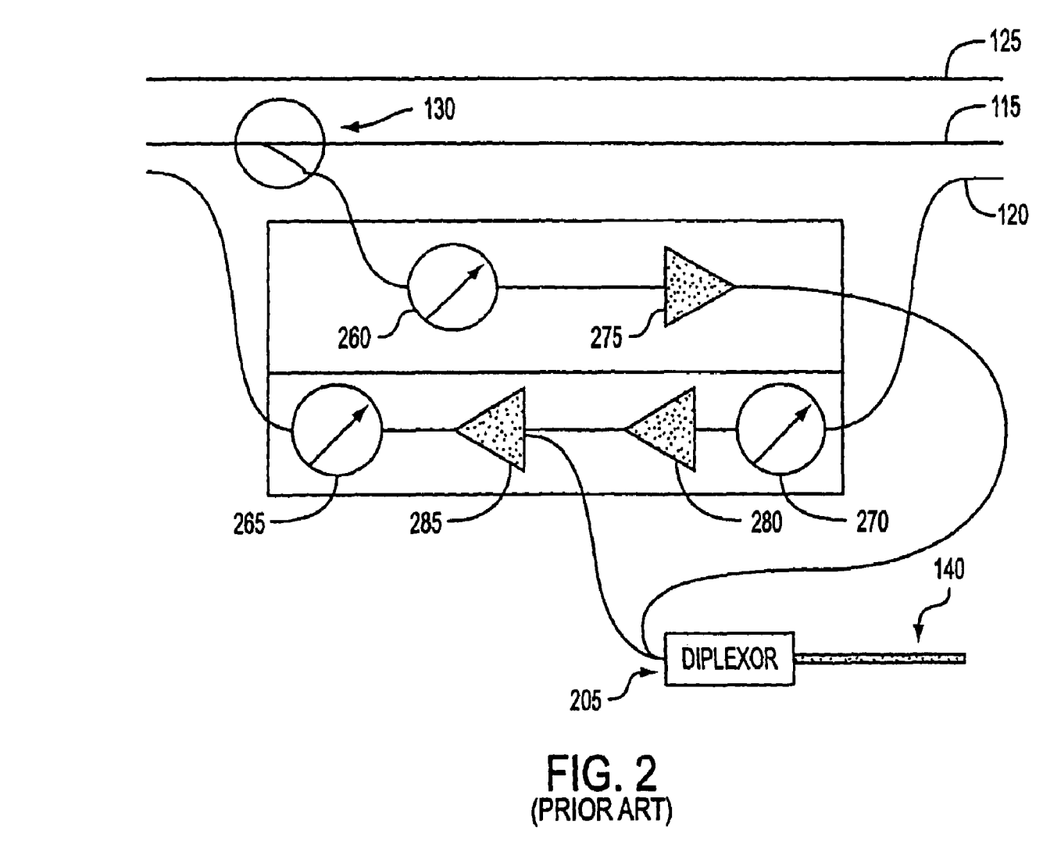
FIG. 2 is an exploded view of a prior art node.

FIGS. 1 and 2 describe the prior art HFC architecture. FIG. 1 is an exemplary prior art HFC architecture. The exemplary HFC architecture used for explanatory purposes herein is AT&T's Oxiom architecture, which is a cost efficient fiber-deep architecture. The nodes for the Oxiom architecture are called Ox-nodes. It should be clear that the present invention is applicable to any similar HFC or PON system/architecture and is not limited to the Oxiom architecture. For purposes of the description presented herein "node" can be an Ox-node or any similarly configured node of any similar HFC or PON architecture.

In the Oxiom architecture one fiber is used for downstream transmission, and a second fiber is used for upstream transmission. Within each node there is an optical power tap, which splits or draws off a fraction of the optical power of all the wavelengths and outputs a portion of the power to the node and passes the remaining power on down the fiber to the next node or nodes. In the Oxiom architecture, a third fiber was also deployed. This was intended to enable segmentation of the serving area. The third fiber would transmit downstream at a different wavelength for each node, and use an optical drop to drop the appropriate wavelength at each node. This would allow each section of coaxial cable to carry unique signals. Broadcast signals (signals that are sent to all of the nodes within the chain) would still be carried over the first fiber.

The exemplary HFC architecture has a hub 105 and a plurality of nodes 110 connected to hub 105 by a plurality of fibers 115–125. Fiber 115 is for downstream transmissions. Fiber 120 is for upstream transmissions. Fiber 125 is for "future services". Each node performs an optical-to-electrical (O/E) conversion to convert the optical signals to electrical signals for use by the coax bus 140. A node 110 is connected to the core optical network via the segment of optical cable upstream from the node. The node 110 is connected to customer/user sites via the coax bus 140. There is an optical power tap 130 within each node. Each coax bus 140 serves a plurality of user sites 135. The plurality of nodes 110 form a node chain.

FIG. 2 is an exploded view of prior art node 110. On the downstream side, for communications from the hub (not shown) to a user site (not shown) on a coax bus 140, the optical power tap 130 draws off a fraction of the signal power to feed the signals destined for user sites on the coax bus 140. An optical-to-electrical (O/E) converter 260 performs an optical-to-electrical conversion on the optical signals. The signals (now electrical) are amplified by electrical amplifier 275 and then the signals are forwarded to the coax bus 140 via a diplexor 205. On the upstream side, for transmissions from a user site destined for the hub or headend of the HFC system, signals are forwarded through a diplexor 205 and combined or summed with other signals from further downstream user sites serviced by further downstream nodes. Signals from user sites at the exploded view node (as with each of the further user sites at further nodes) must be converted from electrical signals carried on the coax bus 140 to optical signals carried on fiber. The electrical signals from the user site travel over the coax bus 140 to diplexor 205 where they are amplified by electrical amplifier 285. Signals from further nodes in the node chain (the chain of cascaded nodes) arrive as optical signals and are converted to electrical signals at the node shown in FIG. 2 by an optical-to-electrical converter 270 and amplified by electrical amplifier 280. The signals (now electrical) from the further nodes in the node chain are now combined with signals (electrical) with from the node shown in FIG. 2 at the electrical amplifier 285. The combined signals (electrical) are then electrical-to-optical converted by electrical-to-optical converter 265 and then added to fiber 120 for forwarding to the hub or headend.

Figure 3:
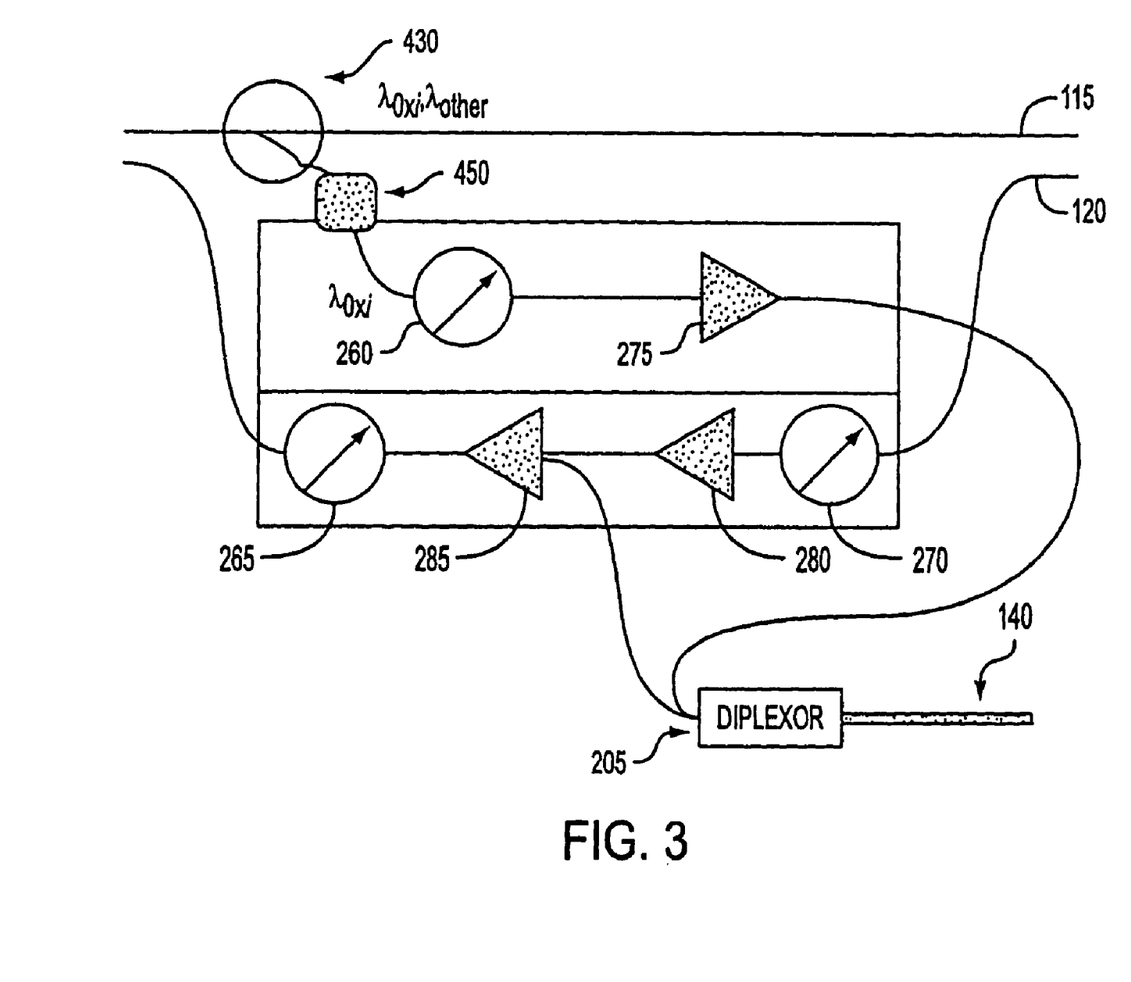
FIG. 3 illustrates the use of an optical filter at a node in accordance with the present invention.

FIGS. 3–7 are descriptive of the present invention. In particular, FIG. 3 illustrates the use of an optical filter at a node. An optical filter 450 is placed before each node. Filter 450 allows only a limited band or band(s) of wavelengths to reach the O/E converter 260. This band includes the original wavelengths used for downstream transmission to the coaxial cable, but it may also transmit additional wavelengths, which may be used in the future to carry signals to the coaxial cable. The optical filter 450 allows the network operator to add signals at new wavelengths to be used for "future services" without those new signals interfering with the signals destined for user sites served by the coaxial cable. Wavelength power tap 430 taps off a fraction of the wavelength power so that the wavelength can be shared across several nodes. A similar technique is used in PS-PON's, where each ONU is preceded with an optical filter. This technique requires that an optical filter be placed before every O/E converter, this makes it difficult to use this technique to upgrade a system (PON or HFC) that has already been deployed without these filters.

Figure 4:
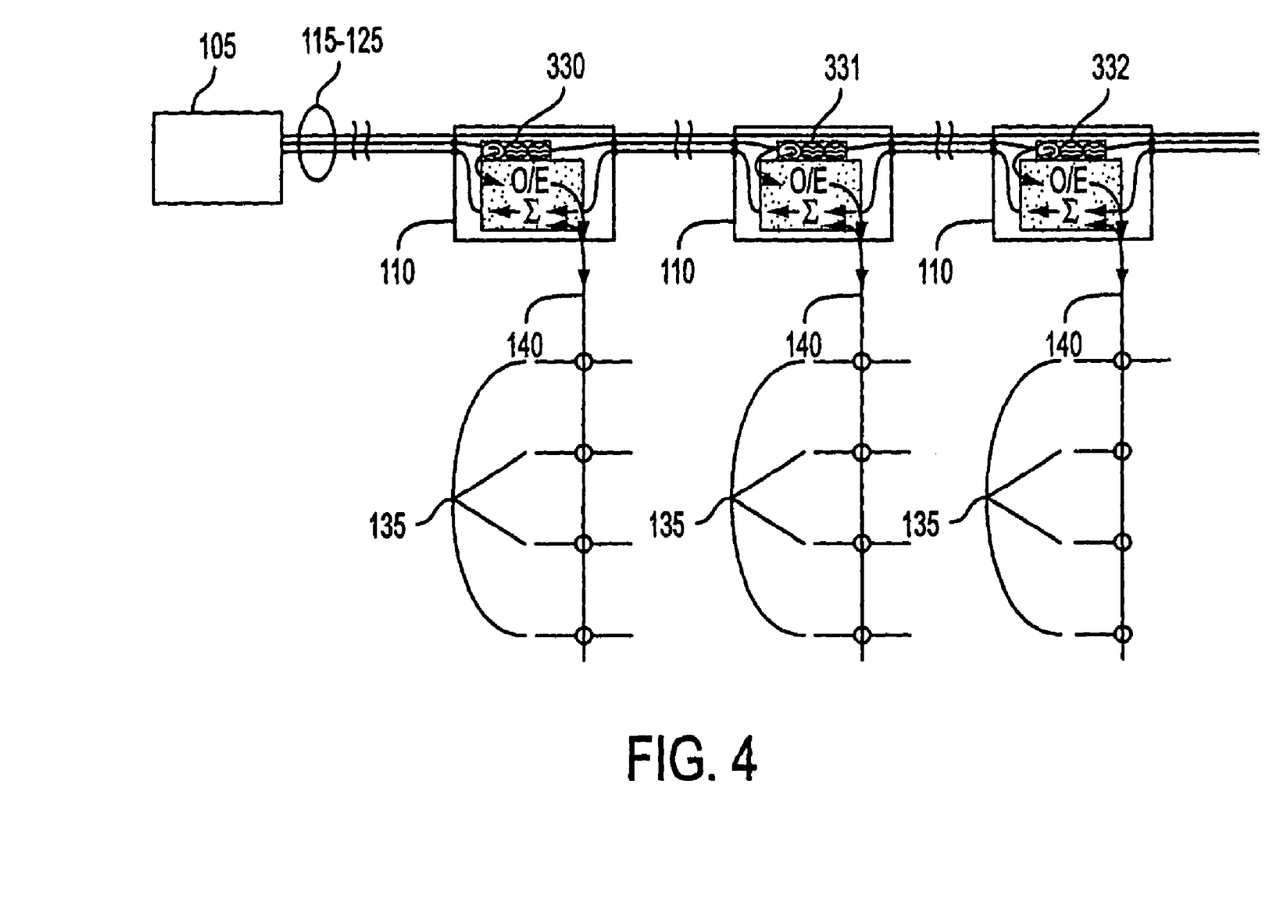
FIG. 4 depicts downstream cell segmentation.

The third fiber deployed in the Oxiom architecture could be used to provide cell-segmentation. An alternative means to provide nodes with both a broadcast signal and a separate wavelength, which is transmitted to a subset of nodes is to use wavelength taps (described in "Broadcasting a Single Wavelength over a WDM Network," by Sheryl Woodward, Mark Feuer, Cedric Lam, Misha Boroditsky, and Adrienne Stiff, Optical Fiber Conference 2001 Technical Digest, Paper WBB2, March 2001 and the subject matter of U.S. patent application Ser. No. 09/469,486 entitled "Method And Device For Broadcasting Signals Over A Wavelength-Division Multiplexed Network", filed Dec. 22, 1999). The use of wavelength taps allows the third fiber to be used for other services, rather than cell segmentation. FIG. 4 depicts downstream cell segmentation without using the third fiber of the Oxiom architecture. FIG. 4 depicts the use of one wavelength across two nodes. In this incremental upgrade optical power taps are replaced with wavelength-power taps, which perform the same function as optical power taps but only on specified wavelengths. That is, a fraction of the power at a specified wavelength is drawn or split off and used by the node and the balance of the power is forwarded over the fiber for use by other nodes further along the fiber. A wavelength-power tap can be made by using a circulator combined with one or more Fiber-Bragg-Gratings (FBG), where the periodicity of each grating determines which wavelength is affected, the strength of each grating determines the fraction of the power dropped. Each node may have wavelength power taps and/or wavelength drops. In FIG. 4 the optical power tap has been replaced by a dual-wavelength power tap 330. Dual-wavelength-power tap 330 drops a fraction of the power at the broadcast wavelength $\lambda_{oxBC}$, and a fraction of the optical power at $\lambda_{ox1}$. Dual-wavelength power tap 331 drops a fraction of the power at the broadcast wavelength, $\lambda_{oxBC}$, and the remaining power at wavelength $\lambda_{ox1}$, so signals carried at $\lambda_{ox1}$ serve only two coax branches. Dual-wavelength power tap 332 drops a fraction of the power at the broadcast wavelength, $\lambda_{oxBC}$ and all the optical power at wavelength $\lambda_{ox2}$, so signals carried at $\lambda_{ox2}$ serve only one coax branch. The wavelengths $\lambda_{oxBC}$, $\lambda_{ox1}$ and $\lambda_{ox2}$ are in the same band. This prior art demonstrates how multiple wavelengths, preferably in the same band, can serve multiple nodes and is one method for flexibly segmenting the serving area. That is, signals carried at $\lambda_{ox-j}$ are no longer shared across a full chain of nodes but may be shared among a subset of nodes.

Figure 5:
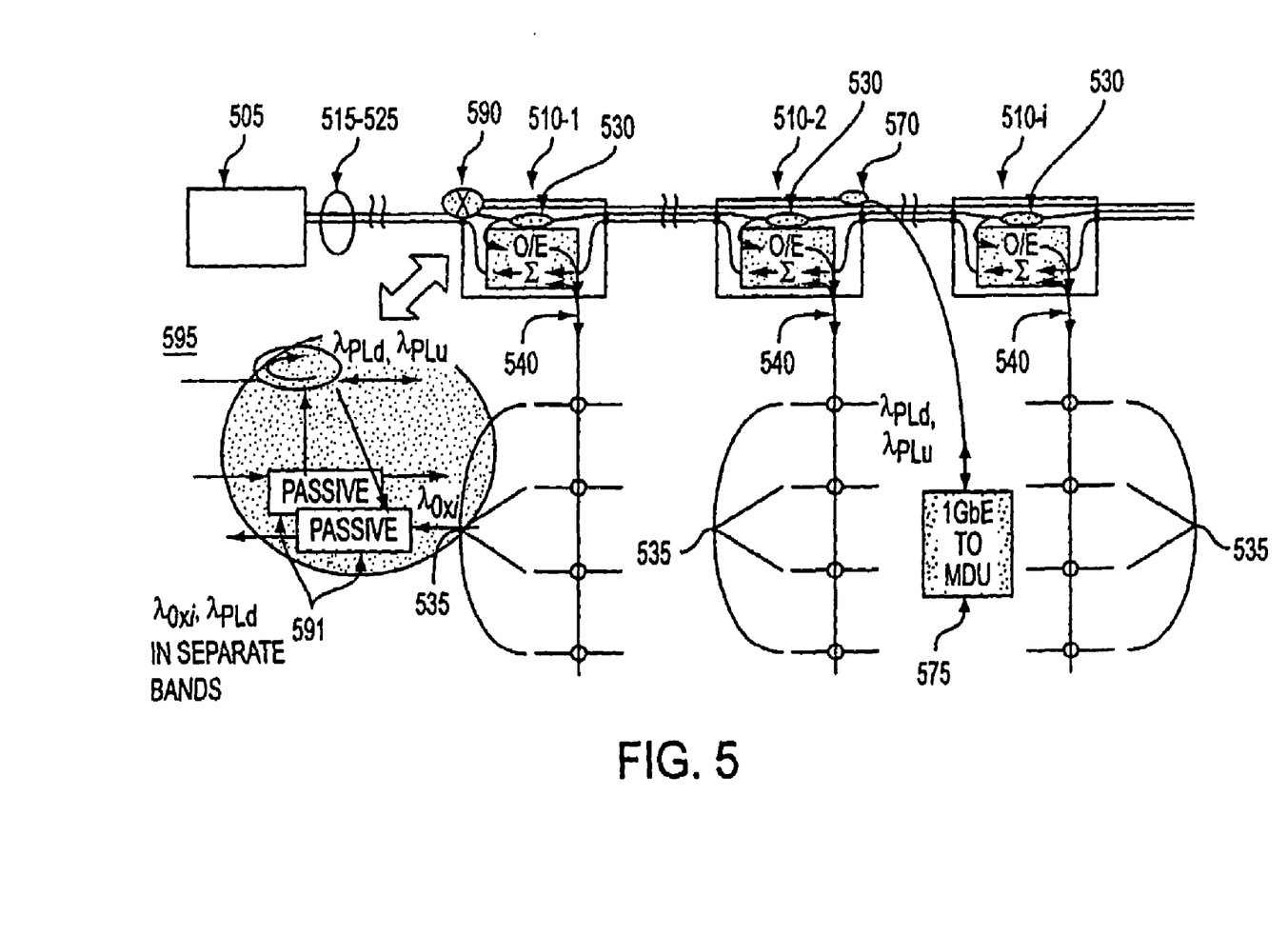
FIG. 5 depicts the addition of new services such as a private line with the present invention over an HFC architecture

FIG. 5 is a preferred embodiment for the addition of new services using the present invention. Just as in the prior art, the architecture has a hub 505 and nodes 510-1, 510-2, . . . , 510-i. The architecture also has coax bus 540 the serves user sites 535 and power taps or wavelength taps and/or wavelength drops 530. Once again three fibers 515–525 are used in the exemplary embodiment. First fiber 515 carries downstream signals. Second fiber 520 carries upstream signals from user sites served by coax bus 540. Each coax bus serves a plurality of user/customer sites. Third fiber 525 carries bi-directional traffic over the portion of the fiber that is between nodes and carries upstream traffic from the chain of nodes (node chain), that now each include an optical drop filter and an optical circulator, to the headend or hub 505. A node 110 is connected to the core optical network via the segment of optical cable (a cable typically comprises multiple optical fibers) upstream from the node. The node 110 is connected to customer/user sites via the coax bus 140. The exemplary architecture connects customer sites to a core optical network and allows for the provisioning of new wavelengths for new services. The wavelength partition 590, comprising a plurality of optical drop filters 591 is preferably placed before the first node in the node chain (in some areas it may be preferable to place it after the first node, e.g., when other locations are more accessible, and no customers of the premium services are forecast to live upstream of the preferred location of wavelength partition 590). The wavelength partition 590 allows the downstream wavelengths carrying signals destined for any customer sites served by the coax bus to pass through the optical drop filter and on to the destination node. Wavelengths, not carrying downstream signals destined for the user sites via the coax buses of the nodes, are connected to the third fiber via an optical circulator 595. The wavelengths, not carrying downstream signals destined for the user sites via the coax buses of the nodes, then travel downstream on the third fiber and when the wavelengths reach optical add-drop multiplexer 570 and are dropped to a user site via a wavelength drop, which forwards the appropriate wavelength to the user/customer site via a drop fiber. An optical add-drop multiplexer enables the architecture of the present invention to deliver optical signals supporting new services directly to and receive optical signals directly from user sites bypassing the coax bus. Signals from the drop are sent upstream either via the same drop fiber or a second drop fiber and put on the third fiber via a wavelength add device. The customer's transceiver (CTx) 575, which includes an optical transceiver, is located at the end of the drop fiber(s), and is used to receive the optical signals, and generate optical signals for transmission to the hub. Although the new service is depicted as providing a dedicated wavelength per customer, it would also be possible for the new service to be a PON overlay, wherein optical add-drop multiplexer 570 is replaced with an optical power-tap, or an optical splitter (either a power splitter or a wavelength-division multiplexer) serving multiple customers via multiple drop fibers.

The wavelength partition 590, placed before the first node, is shown in the exploded view and comprises a plurality of passive optical drop filters 591, which allow the downstream wavelengths carrying signals destined for nodes served by any coax bus to pass through the filter and on to the nodes that serve user sites. The wavelengths that enter the passive optical filter are represented by $\lambda_{oxi}$ and $\lambda_{di}$, which are in separate bands. Wavelength $\lambda_{di}$ represents a wavelength traveling downsteam that is not carrying signals destined for user sites via coax buses. Wavelength $\lambda_{oxi}$ is passed through the filter and travels on to the destination node. The passive optical filter does not allow wavelength $\lambda_{oxi}$ to enter the optical circulator 595. Wavelength $\lambda_{di}$ enters the optical circulator 595 and is connected to the third fiber for forwarding to a user site. Wavelength $\lambda_{ui}$ represents a wavelength traveling upstream from user sites served by the third fiber and wavelength $\lambda_{ui}$ is put on the third fiber via a optical add-drop multiplexer 570. Since both $\lambda_{di}$ and $\lambda_{ui}$ both travel on the third fiber, both wavelengths must pass through optical circulator 595. Wavelength $\lambda_{ui}$ travels to the hub via the third optical fiber. This allows the wavelength partition 590 to be placed after the first node of the chain of nodes, without the upstream signals $\lambda_{ui}$ interfering with the upstream signals sent via the coax and nodes.

Figure 6:
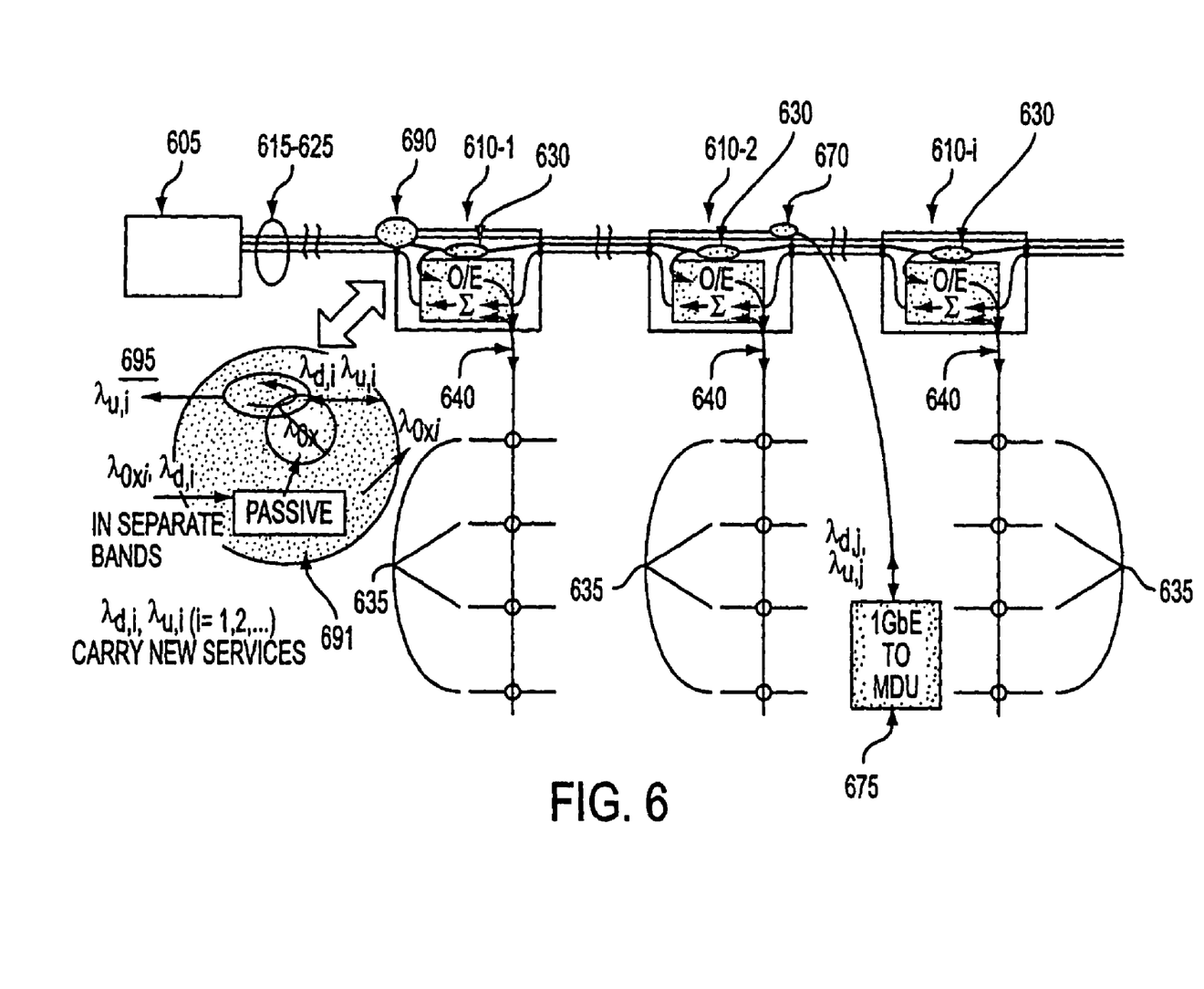
FIG. 6 depicts how the add-drop discussed in FIG. 5 might be implemented.

FIG. 6 depicts the addition of new services, such as a private line, with the present invention. FIG. 6 is similar to FIG. 5 in all major areas with like components labeled alike. FIG. 6, however, has a single passive optical drop filter 691 rather than the plurality of optical drop filters 591 in FIG. 5.

The embodiment depicted in FIG. 5 is preferable to the embodiment depicted in FIG. 6 because only two fibers need to be used between the passive optical amplifier 590 placed before the first node and denoted by a circle with an "x" and the hub 505. This saves on optical amplifiers, such as Erbium-Doped-Fiber Amplifiers (EDFA). The only substantial difference is in the green circle marked "x", which now contains two passive devices in the preferred embodiment depicted in FIG. 5, both of which are attached to the optical circulator.

The embodiment in FIG. 6 would be used when it was preferable to use all three fibers (for example, when it was necessary to insert the circle marked with an "x" downstream from the first node, in which case it would be desirable to use a separate fiber for upstream transmission of node and new traffic. It may also be desirable to use the third fiber for downstream transmission if optical non-linearities may cause crosstalk between the new traffic and the downstream node traffic.

Figure 7:
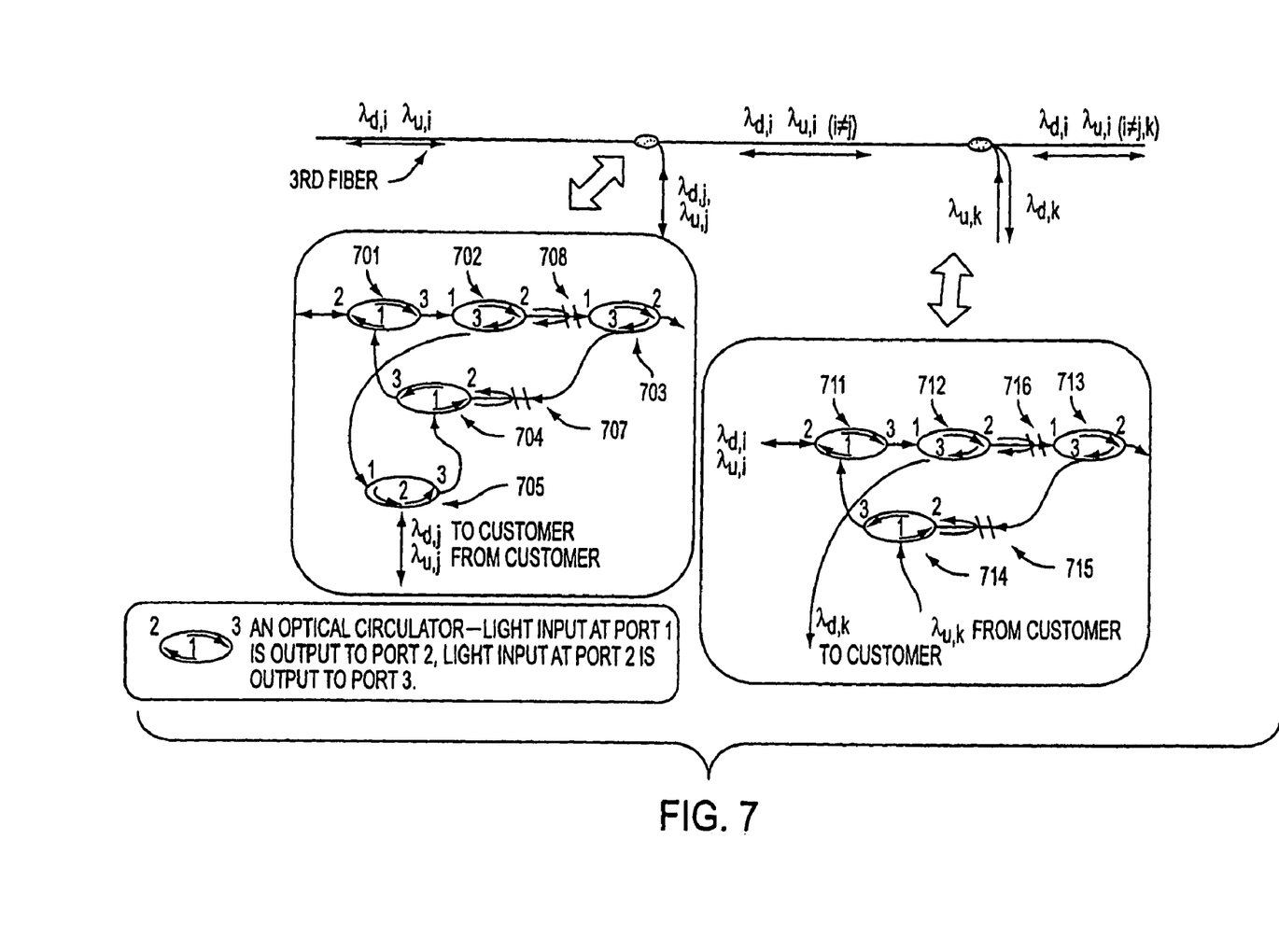
FIG. 7 depicts another method for implementing this new service over HFC architecture

FIG. 7 depicts how the optical add-drop multiplexer 670 discussed in light of FIG. 6 might be implemented. Two different alternative embodiments are depicted. Wavelengths $\lambda_{di}$ and $\lambda_{ui}$ travel on the third fiber. The leftmost exploded view is for a single fiber add-drop connection for customer/user site j, with wavelengths $\lambda_{dj}$ and $\lambda_{uj}$. In a single fiber add-drop, a single fiber is used for both adding upstream signals and dropping downstream signals. Five circulators and two Fiber Bragg Gratings (FBGs) are used. The optical circulators operate in the following manner: light input at port 1 is output at port 2; and light input at port 2 is output at port 3. Input wavelengths traveling downstream (from the hub), including $\lambda_{di}$, enter clockwise rotating optical circulator 601 at port 2 and are output at port 3 of circulator 701, whereupon the wavelengths enter clockwise rotating circulator 702 at port 1 and are output from port 2. Wavelengths, not destined for the user site served by the single fiber add-drop, pass through FBG 708 and on to clockwise rotating circulator 703 at port 1 and are output back onto the third fiber for forwarding on to a further add-drop on the third fiber. Meanwhile, wavelength $\lambda_{dj}$ is reflected back to circulator 702 by FBG 708, entering at port 2 and exiting at port 3 of circulator 702. Wavelength $\lambda_{dj}$ is then forwarded to counter-clockwise rotating optical circulator 705 at port 1 and is output at port 2 to the user site served by the single fiber add-drop. Upstream signals from the user site served by the single fiber add-drop is accepted by circulator 705 at port 2 and output at port 3 of circulator 705. The upstream signals are then forwarded to counter-clockwise rotating optical circulator 704 at port 1. Upstream wavelength $\lambda_{uj}$ is output at port 2 where it is reflected back by FBG 707 to re-enter circulator 704 at port 2 and output at port 3. Upstream wavelength $\lambda_{uj}$ is then forwarded to circulator 701 at port 1 and output to the third fiber at port 2. Upstream wavelengths $\lambda_{uj}$ from further nodes in the node chain destined for the hub or headend, enter circulator 703 at port 2 and are output at port 3 where the upstream signals pass through FBG 707 and on to circulator 704 at port 2. Upstream wavelength $\lambda_{uj}$ is then output at port 3 of circulator 704 and forwarded to circulator 701 at port 1 and is output onto the third fiber at port 2.

The rightmost exploded view depicts a two fiber add-drop connection for user/customer site k. Four optical circulators and two FBGs are used to implement the two-fiber add-drop. Downstream wavelengths, including $\lambda_{dk}$ (but not including $\lambda_{dj}$, as this wavelength has already been dropped) enter clockwise rotating optical circulator 711 at port 2 and are output at port 3 to be forwarded and enter clockwise rotating optical circulator 712 at port 1. Downstream wavelengths, including $\lambda_{dk}$ are output from circulator 712 at port 2 where $\lambda_{dk}$ is reflected back to circulator 712 at port 2 by FBG 716 and output at port 3. Meanwhile other downstream wavelengths $\lambda_{di}$ (not destined for the user site (k) served by the two fiber add-drop) pass through FBG 716 and proceed on downstream via the third fiber. Signals output from port 3 of circulator 712 are forwarded directly to user k. Upstream wavelength $\lambda_{uk}$ from user k destined for the hub or headend are input to counter-clockwise rotating optical circulator 714 at port 1. The upstream wavelength $\lambda_{uk}$ is output at port 2 but is reflected back to circulator 714 by FBG 715 at port 2 and output at port 3. The upstream wavelength $\lambda_{uk}$ is then forwarded to circulator 711 at port 1 and output to the third fiber at port 2; Upstream wavelength $\lambda_{ui}$ from a further node in the node chain destined for the hub or headend, enters circulator 713 at port 2 and is output at port 3 and passes through FBG 715 and enters circulator 714 at port 2. Upstream wavelength $\lambda_{ui}$ exits circulator 714 at port 3 with $\lambda_{uk}$ and is then forwarded to circulator 711 at port 1 and output to the third fiber at port 2.

Any similar device having the same functionality as the single fiber add-drop or the two-fiber add-drop can be substituted in the design.

Although the present application has focused on the Oxiom architecture, it should be clear that the present invention could be applied to both a conventional HFC architecture (for an overview of HFC architectures see Chapter 14 of Telecommunications IIIA, the chapter is by Mary R. Phillips and Thomas E. Darcie, and is entitled "Lightwave Analog Video Transmission, the book is edited by Ivan P. Kaminow and Thomas L. Koch, published 1997 by Academic Press, ISBN: 0-12-395170-4) wherein the wavelength partition is placed before the fiber node, or to LightWire™, (for background on the LightWire architecture we could reference LightWire patent—"Fiber and Wire Communication System" Docket No. 1999-0124, inventors: Combs Darcie, Desai, Gnauck, Lu, Sandino, Sniezko, Werner, & Woodward), wherein the wavelength partition is placed either before the Mux-Node or before a mini-fiber node.

The invention can also be used to bypass optical splitters in a PS-PON. In a PS-PON the optical transmitter located in the hub is used to carry signals downstream to multiple customer sites, therefore the downstream capacity is shared. Similarly, the receiver located in a hub is also shared, which limits the capacity per user of the upstream channel. Not only is the capacity shared, the optical splitters present in a PS-PON introduce optical loss, which reduces the amount of light reaching the optical receivers, and may, therefore, reduce the peak bit-rate of the system.

Figure 8:
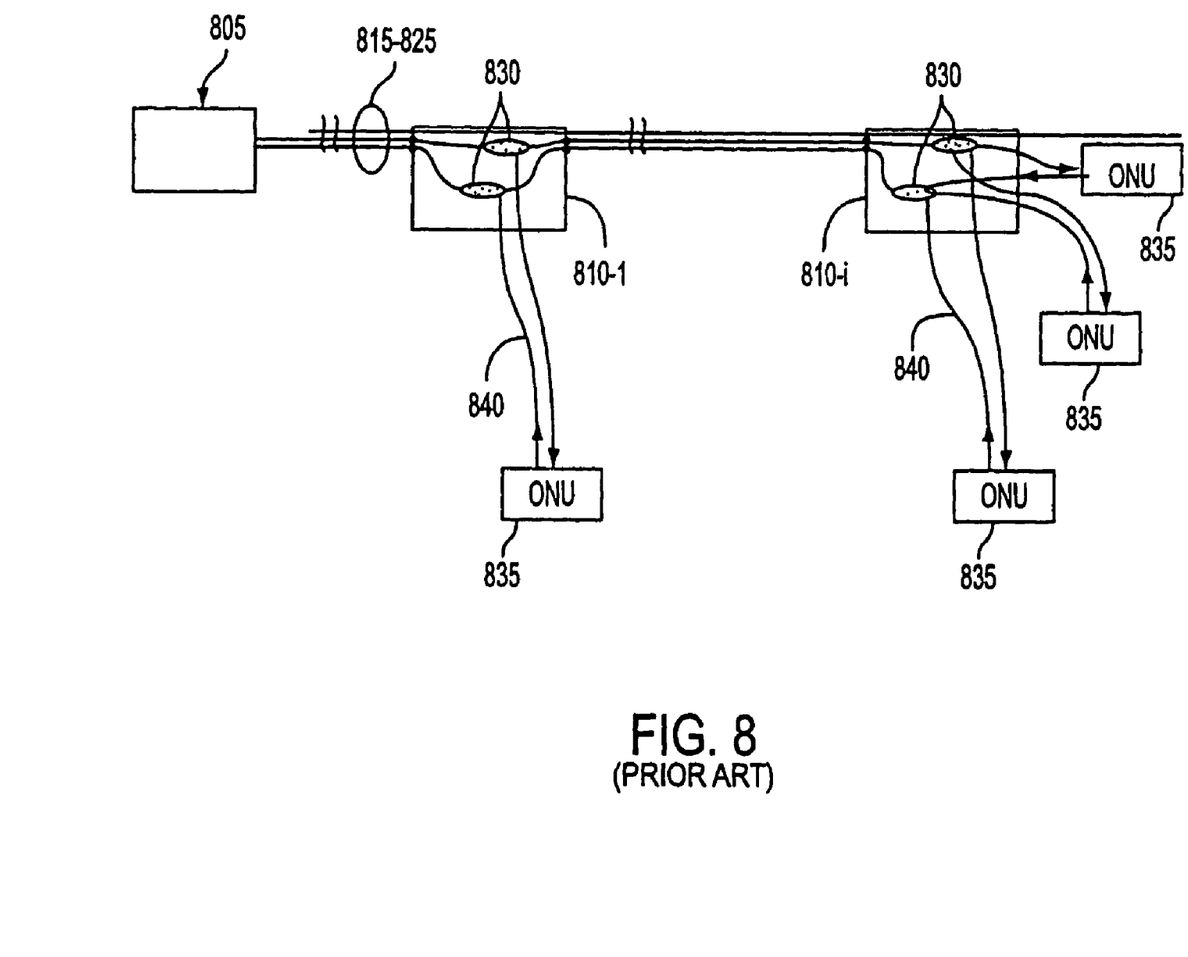
FIG. 8 is an exemplary prior art PON.
Figure 9:
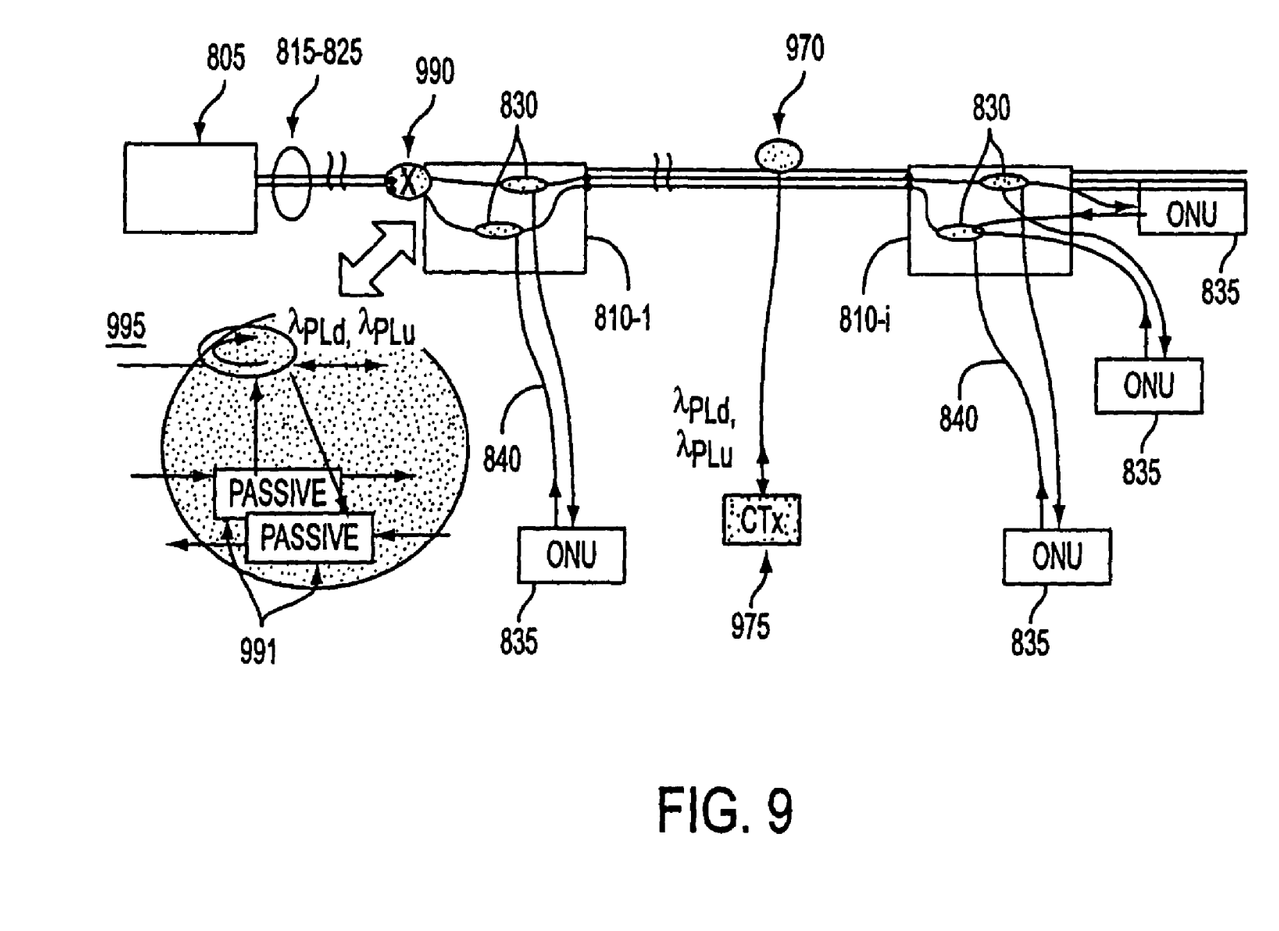
FIG. 9 depicts the addition of new services such as a private line with the present invention over a PON.

An exemplary prior art PON architecture is shown in FIG. 8. It has a hub 805 and a plurality of nodes 810 connected to hub 805 by a plurality of fibers 815–825. The hub may comprise a host-digital terminal located at a remote location, or it may be a Central Office. Fiber 815 is for downstream transmissions. Fiber 820 is for upstream transmissions. Fiber 825 is dark, That is, fiber 825 does not carry any signals, and might not connect to the hub. Each node contains an optical splitter, and forwards the downstream signals to additional nodes or ONUs 835 located further downstream. Node 810 contains an optical splitter 830, which combines upstream signals sent from the ONUs 835 via optical drop fibers 840 onto fiber 820. In accordance with the present invention, FIG. 9 depicts the addition of new services, such as a private line. Just as in the prior art, the architecture has a hub 805 and nodes 810-1, 810-2, ..., 810-i. Each node is connected to multiple fibers, each fiber may connect to additional nodes, or to ONUs. Three fibers 815–825 are used in the exemplary embodiment First fiber 815 carries downstream signals from the hub to ONUs and nodes. Second fiber 820 carries upstream signals from user sites served by ONUs. Third fiber 825 carries bidirectional traffic from optical transceivers to a wavelength partition 990, inserted before a node of the original PON.

The wavelength partition 990, comprising an optical drop filter 991 is preferably placed before the first node in the PON (in some areas it may be preferable to place it after the first node, e.g., when other locations are more accessible, and no customers of the premium services are forecast to live upstream of the preferred location of wavelength partition 990, or when dark fiber is not available over the entire path from the first node to the optical add-drop multiplexer 970 for the customer). The wavelength partition 990, allows the downstream wavelengths carrying signals destined for any ONU to pass through the optical drop filter 991 and on to the destination ONU. Wavelengths not carrying downstream signals destined for the user sites via the nodes are connected to the third fiber via an optical circulator 995. The wavelengths not carrying downstream signals destined for the ONUs, then travel downstream on the third fiber and when the wavelengths reach the an optical add-drop multiplexer 970 the wavelengths are dropped to a user site via a wavelength drop, which forwards the appropriate wavelength to the user/customer site via a drop fiber. Signals from the drop are sent upstream either via the same drop fiber or a second drop fiber and put on the third fiber via a wavelength add device.

Although the new service is depicted as providing a dedicated wavelength per customer, it would also be possible for the new service to be a PON overlay, wherein optical add-drop multiplexer 970 is replaced with an optical power-tap, or an optical splitter (either a power splitter or a wavelength-division multiplexer) serving multiple customers via multiple drop fibers. This PON overlay may provide superior service than the original PON, but that need not be the case. It would be sensible to overlay one PON over a pre-existing PON if the new PON allows additional customers to be served, if the overlay offers a substantially different service than the original PON, or if the overlay provides a lower-cost connection than the original (e.g., through greater sharing of the equipment in the hub, or lower-cost ONUs).

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

I claim:

1. A distribution network, for connecting a plurality of customer sites to a core optical network, comprising:
   a first segment, wherein said first segment is coupled to said core optical network;
   a second segment, wherein said second segment further comprises a first fiber, a second fiber, and a third fiber;
   a wavelength partition, wherein said first segment is further coupled to said wavelength partition, and further wherein said second segment is coupled to said wavelength partition;
   at least one node, wherein said first fiber carries optical signals from said wavelength partition to a plurality of customer sites via said at least one node, and wherein said second fiber carries optical signals from said plurality of customer sites to said wavelength partition via said at least one node; and
   at least one customer's transceiver (CTx), wherein said third fiber carries optical signals in both directions between said wavelength partition and said at least one customer's transceiver (CTx),
   wherein said first segment further comprises a first fiber carrying signals from said core optical network destined for said at least one node and said customer's transceiver, a second fiber carrying signals from said at least one node to said core optical network, and a third fiber carrying signals from said customer's trancsceiver to said core optical network.

2. A distribution network, for connecting a plurality of customer sites to a core optical network, comprising:
   a first segment, wherein said first segment is coupled to said core optical network;
   a second segment, wherein said second segment further comprises a first fiber, a second fiber, and a third fiber;
   a wavelength partition, wherein said first segment is further coupled to said wavelength partition, and further wherein said second segment is coupled to said wavelength partition;
   at least one node, wherein said first fiber carries optical signals from said wavelength partition to a plurality of customer sites via said at least one node, and wherein said second fiber carries optical signals from said plurality of customer sites to said wavelength partition via said at least one node; and
   at least one customer's transceiver (CTx), wherein said third fiber carries optical signals in both directions between said wavelength partition and said at least one customer's transceiver (CTx),
   wherein said first segment further comprises a first fiber carrying signals from said core optical network destined for said at least one node, a second fiber carrying signals from said at least one node and said customer's transceiver to said core optical network, and a third fiber carrying signals from said core optical network to said customer's transceiver.

* * * * *